Nov. 21, 1950     E. Q. MOSES     2,530,986
PLASTER OF PARIS CONTAINING PAPER
AND METHOD OF MAKING
Filed Aug. 12, 1944
Fig. 1.
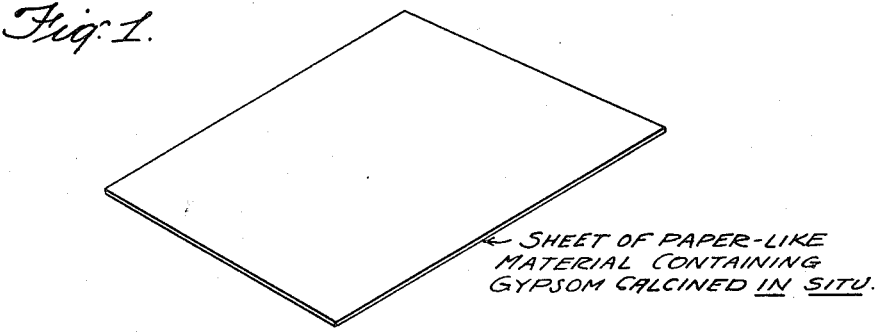
SHEET OF PAPER-LIKE
MATERIAL CONTAINING
GYPSOM CALCINED IN SITU.
     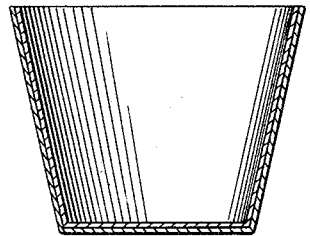
Fig. 2.     Fig. 3.
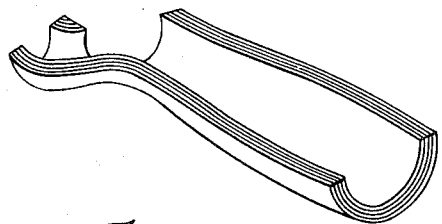
Fig. 4.
INVENTOR
EDMUND QUINCY MOSES
BY
Moses, Nolte, Crews & Berry
ATTORNEYS Patented Nov. 21, 1950

2,530,986

UNITED STATES PATENT OFFICE 2,530,986

PLASTER OF PARIS CONTAINING PAPER AND METHOD OF MAKING

Edmund Quincy Moses, Scarborough, N. Y.

Application August 12, 1944, Serial No. 549,274

7 Claims. (Cl. 92—3)

This invention relates to a paper composition containing a substantial quantity of plaster of Paris adapted to set upon the addition of water thereto and to articles made therefrom.

Gypsum or calcium sulfate dihydrate $$CaSO_4 2H_2O$$

is well known and abundantly found in nature. It has heretofore been used as a filler for paper. When gypsum is heated to between 120 and 130° C. three molecules of water are driven off for each two molecules of gypsum, yielding plaster of Paris, calcium sulfate hemihydrate $$2CaSO_4 H_2O$$

In this condition plaster of Paris possesses the property of combining with water, each two molecules of calcium sulfate taking up three molecules of water of crystallization during which process the plaster of Paris sets into a hard chalky mass. The properties of these substances are well known in the ceramic arts and have been utilized in many forms for various well known purposes.

I have now discovered that these properties of the various forms of calcium sulfate may be utilized in combination with fibrous material to form a paper or paper-like composition which possesses the property of being settable when dampened with water.

I can effect this desirable result by adding gypsum to pulp or paper stock during the manufacturing process of the paper, subsequently heating the paper to drive off water of crystallization to calcine the gypsum whereby I obtain a paper or paper-like material containing calcined gypsum. The material can be formed or shaped as desired, and can be caused to set in a permanently hard formed condition by wetting with water and permitting the material to set.

My new paper composition is valuable for many uses, for example, the sheet of paper containing calcined gypsum may suitably be formed into paper utensils, dishes, ash trays, and other forms in which condition addition of water thereto will cause the plaster to set giving strong supported or reinforced paper articles. The composition may also be used for surgical splints as the flexible sheet of paper containing calcined gypsum may be applied to the affected part and sprayed with water whereupon it will set hard about the affected part forming adequate support.

It will be noted that since only minor changes of volume occur on the combination of the hemihydrate with water, the slight expansion which takes place during the absorption of water of crystallization will be a great advantage as the strength of the bond between the plaster and fiber combination will, if anything, be enhanced by the expansion. The material may also be molded in metal or other molds in which it will set and give a sharp impression due to the slight expansion noted.

In carrying out the steps of my invention, finely divided uncalcined gypsum may be added directly to paper pulp during the course of manufacture of paper or it may be added to a mass of paper pulp which has been obtained by macerating with water already manufactured paper, paper fibers obtained from waste paper, newspaper pulp, or the like. Amounts up to more than fifty percent of gypsum may be added in this manner depending upon the purpose for which the material is to be used, while still enabling me to obtain a composition which possesses the essential qualities of paper. When the mixture has become sufficiently homogeneous and the fibers and gypsum are mixed through each other, the paper making process may be continued, and paper in sheet form is evolved in the usual manner. In this state the paper will contain amounts of uncalcined gypsum up to 50% or more of the total volume of the paper but will nevertheless partake of the nature of paper rather than fiber filled plaster. The paper may now be suitably heated to a temperature of 120 to 130° C. to drive off three molecules of water for each two molecules of $CaSO_4$. This will result in no great change in the paper-like nature of the composition and in fact it may conveniently be accomplished as a part of the paper making process so that the entire process up to this point may conveniently be run in a continuous fashion. Heating to a temperature and for a time sufficient to calcine the gypsum may be readily carried out without raising the temperature to a point at which the fibre will char. No injury to the fibre will occur. In some instances asbestos or other non-charring fibre may be used, in which case higher temperatures may be used if desired.

This paper heavily loaded with calcined gypsum or plaster of Paris may, if desired, be stored for a considerable period of time, as little water of crystallization will be absorbed from the air, and may be formed into rolls, sheets, or the like. Paper objects, utensils and the like may be suitably formed of this material by pressing with dies or in any convenient manner. On the addition of water to this material a strong stiff plaster-like sheet of relative thinness but of great strength in view of its thinness will be obtained. The application of water may be accomplished by spraying or dipping or in any convenient manner.

It will be understood that in the paper or paper-like product produced in accordance with the present invention the gypsum being thoroughly mixed with the pulp during the process of making the paper is intimately incorporated with the paper like an ordinary paper filler, and is usually distributed with substantial uniformity throughout the paper. Accordingly after the paper has been heat treated to calcine the gypsum the resultant product is a paper or paper-like material having plaster of Paris substantially uniformly distributed throughout the same, and intimately incorporated therein. This product is entirely different from the product which can be obtained by applying plaster of Paris to the surface of a porous paper, or by attempting to force such a material into the interstices of the paper by mechanical means.

The paper or paper-like material of the present invention, before being moistened, has the property common to paper and retains the usual flexibility and formability which the material would possess if formed out of ordinary paper making materials. It is only after the application of water to the paper that it sets and becomes hard.

In the accompanying drawings,

Figure 1 is a perspective view of a sheet of the material embodying the present invention;

Figure 2 is a vertical sectional view of a dish, ashtray, or the like, made in accordance with the present invention;

Figure 3 is a similar view of a drinking cup or the like, formed out of two thicknesses of the paper; and Figure 4 is a perspective view of a surgical splint made out of several layers of the material of the present invention.

While I have described a preferred procedure to be followed in practicing my invention, which I have found to be convenient and practicable, I do not wish to be understood as limiting myself to the performance of the process in the precise manner set forth or the following of a particular sequence of operations where not essential to secure the intended result, as I realize that changes in procedure are possible and I further intend each step or sequence of steps and each element or instrumentality appearing in any of the following claims to be understood to refer to all equivalent steps, sequences of steps, elements or instrumentalities for accomplishing substantially the same result in substantially the same or equivalent manner.

What is claimed is:

1. The process of making a fibrous paper-like material containing plaster of Paris, which consists in beating up paper pulp with finely divided gypsum, forming the pulp into a sheet, drying the sheet, and heating the sheet to a temperature below that at which the pulp will be injured for a sufficient length of time to convert the gypsum in the sheet into plaster of Paris.

2. The process of making a formed paper article which consists in beating up paper pulp and finely divided gypsum, forming the pulp containing the gypsum into a sheet, drying the sheet, heating the sheet to convert the gypsum into plaster of Paris, forming the desired article from said sheet, wetting said article, and permitting the same to set in the desired form.

3. The process which includes the steps of intimately combining gypsum and fibrous paper pulp material in an aqueous liquid carrier, driving off superficial liquid, and heating said composition to convert said gypsum into plaster of Paris.

4. A cohesive flexible, substantially homogeneous, dry paper web containing paper pulp material and unhydrated plaster of Paris in sufficient quantity to render the paper settable after moistening.

5. The process of making fibrous paper-like material containing plaster of Paris which consists of beating up paper pulp with gypsum in amounts up to 50 percent of the total volume of the paper, forming the mixture into a paper sheet, drying the paper sheet and heating the sheet up to a temperature of 120 to 130 degrees C. to convert the gypsum into plaster Paris.

6. A cohesive flexible dry paper web comprising paper pulp and up to 50 percent by volume of unhydrated plaster of Paris in sufficient quantity to render the paper web settable after moistening, the pulp fibres and plaster particles being thoroughly intermingled throughout the thickness of the paper web.

7. A cohesive, flexible, dry paper web, comprising paper pulp material and unhydrated plaster of Paris in sufficient quantity to render the paper web settable after moistening, the pulp fibres being thoroughly mixed with the plaster particles to form a material having the appearance and feel of paper with the pulp fibres extending to the surface thereof, so that after the web has been wet and allowed to set a body will be formed having a firm reinforced surface.

EDMUND QUINCY MOSES.

REFERENCES CITED

The following references are of record in the file of this patent:

UNITED STATES PATENTS

| Number | Name | Date |
|---|---|---|
| 1,211,028 | Zappi | Jan. 2, 1917 |
| 1,693,715 | Kobbe | Dec. 4, 1928 |
| 1,932,120 | Roos | Oct. 24, 1933 |
| 1,967,029 | Karrick | July 17, 1934 |
| 2,001,245 | Gephart | May 14, 1935 |
| 2,009,597 | Weber | July 30, 1935 |
| 2,076,349 | Porter | Apr. 6, 1937 |
| 2,134,963 | Weber | Nov. 1, 1938 |